US007500711B1

(12) United States Patent
Ewing et al.

(10) Patent No.: US 7,500,711 B1
(45) Date of Patent: Mar. 10, 2009

(54) POWER DOOR FOR A PASSENGER VEHICLE

(75) Inventors: Kip Alan Ewing, Bloomfield Hills, MI (US); Donald G. Mikolai, Dearborn, MI (US); Kelly Michael Kohlstrand, Wyandotte, MI (US); Jason Falenski, Berkley, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/844,661

(22) Filed: Aug. 24, 2007

(51) Int. Cl.
*B60J 5/10* (2006.01)

(52) U.S. Cl. .................... 296/146.4; 49/343; 296/146.1

(58) Field of Classification Search ............. 296/146.1, 296/146.4, 146.11; 49/343
See application file for complete search history.

(56) References Cited

U.S. PATENT DOCUMENTS

| | | | | |
|---|---|---|---|---|
| 3,713,472 | A | 1/1973 | Dozois | |
| 6,382,706 | B2 | 5/2002 | Yuge et al. | |
| 6,401,392 | B1 | 6/2002 | Yuge | |
| 6,513,859 | B2 | 2/2003 | Yuge | |
| 6,550,839 | B2 | 4/2003 | Rogers, Jr. et al. | |
| 6,767,048 | B2 | 7/2004 | Yokota | |
| 6,776,443 | B2 | 8/2004 | Shimura et al. | |
| 6,799,790 | B2 | 10/2004 | Sakai et al. | |
| 6,834,463 | B2 | 12/2004 | Fukumoto et al. | |
| 6,871,449 | B2 | 3/2005 | Ihashi | |
| 6,891,344 | B2 | 5/2005 | Sakai et al. | |
| 6,918,208 | B2 | 7/2005 | Oberheide et al. | |
| 6,929,310 | B2 | 8/2005 | Okada | |
| 6,964,449 | B2 | 11/2005 | Takeda et al. | |
| 7,017,973 | B2 | 3/2006 | Sera et al. | |
| 7,021,004 | B2 | 4/2006 | Ritter | |
| 7,069,695 | B2 | 7/2006 | Hattori et al. | |
| 7,121,043 | B2 | 10/2006 | Yokota | |
| 7,143,548 | B2 | 12/2006 | Kleinmann et al. | |
| 7,219,945 | B1 | 5/2007 | Zinn et al. | |
| 2004/0212334 | A1 | 10/2004 | Kawanobe | |
| 2005/0102905 | A1 | 5/2005 | Ichinose | |
| 2007/0262609 | A1 * | 11/2007 | King et al. | 296/146.8 |

FOREIGN PATENT DOCUMENTS

| | | | |
|---|---|---|---|
| CA | 2444670 | A1 | 4/2004 |
| JP | 2003232168 | A | 8/2003 |
| JP | 2005113554 | A | 4/2005 |
| JP | 2005325601 | A | 11/2005 |
| JP | 2005330724 | A | 12/2005 |
| JP | 2006057391 | A | 3/2006 |

* cited by examiner

*Primary Examiner*—Joseph D Pape
(74) *Attorney, Agent, or Firm*—Gregory Brown; Brooks Kushman P.C.

(57) ABSTRACT

In one embodiment, an automotive vehicle is disclosed having a vehicle body with a first pillar, a second pillar, a roof member and a floor member defining a door opening therebetween. A lateral side entry door is pivotally connected to the vehicle body for enclosing the door opening. The side entry door moves along an operating path having a closed position and an open position. The vehicle has a motor and a lead screw mounted in the side entry door and connected to the motor to be driven by the motor. The vehicle has a link connected to the lead screw and connected to the vehicle body adjacent to the door opening. The motor drives the lead screw to translate the link to open and close the side entry door.

20 Claims, 5 Drawing Sheets

POWER DOOR FOR A PASSENGER VEHICLE

BACKGROUND OF THE INVENTION

1. Field of the Invention

The invention generally relates to a power door for a passenger vehicle.

2. Background Art

Passenger vehicles generally have at least one side-entry door located on either lateral side of a vehicle body of the passenger vehicle. Two or more doors are typically provided on one lateral side of the vehicle. These doors allow passenger ingress and egress to and from the vehicle. The doors for the passenger vehicles can be power doors so that manual translation of the doors is not required.

Power side entry doors can have hinged connections between the door and the body. These power hinged doors can open toward the front end of the vehicles, which is often seen in various types of passenger vehicles. The power hinged doors can open toward a back end of the vehicles, which is commonly seen in many vehicles such as sedans, trucks, and vans.

There are various existing power doors with hinged connections. Some common power doors utilize various types of rack and pinion opening and closing systems. Other common power doors are operated by linkages. Still other typical power doors are driven by a cable.

Power side entry doors can have sliding connections between the door and the body. Power sliding doors are common in vehicles such as vans.

SUMMARY OF THE INVENTION

In one embodiment, an automotive vehicle is disclosed having a vehicle body with a first pillar, a second pillar, a roof member and a floor member defining a door opening therebetween. A lateral side entry door is pivotally connected to the vehicle body for enclosing the door opening. The side entry door moves along an operating path having a closed position and an open position. The vehicle has a motor and a lead screw mounted in the side entry door and connected to the motor to be driven by the motor. The vehicle has a link connected to the lead screw and connected to the vehicle body adjacent to the door opening. The motor drives the lead screw to translate the link to open and close the side entry door.

In another embodiment, an automotive vehicle is disclosed having a vehicle body with a first pillar, a second pillar, a roof member and a floor member defining a door opening therebetween. The vehicle has a side entry door pivotally connected to the vehicle body for enclosing the door opening. The side entry door moves along an operating path and having a closed position and an open position. The vehicle has a motor oriented in the side entry door. The vehicle has a transmission mounted in the side entry door and connected to the motor to be driven by the motor. The vehicle has a check strap mounted on the vehicle body and pivotally connected to the transmission. The check strap has at least one detent provided therein to cooperate with at least one roller for manual translation of the side entry door so that the check strap maintains the side entry door in an intermediate position between the open position and the closed position. The motor drives the lead screw to translate the check strap to open and close the side entry door.

In yet another embodiment, a power door assembly for a vehicle is disclosed. The power door assembly has a side entry door with a first hinge portion to be pivotally connected to a vehicle body for enclosing a door opening for movement along an operating path for opening the side entry door from the door opening and closing the side entry door to the door opening. The power door assembly has a motor oriented in the side entry door and a lead screw mounted on the side entry door and connected to the motor to be driven by the motor. The power door assembly has a link connected to the lead screw and adapted to be connected to the vehicle body adjacent to the door opening. The motor drives the lead screw to translate the link to open and close the side entry door.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
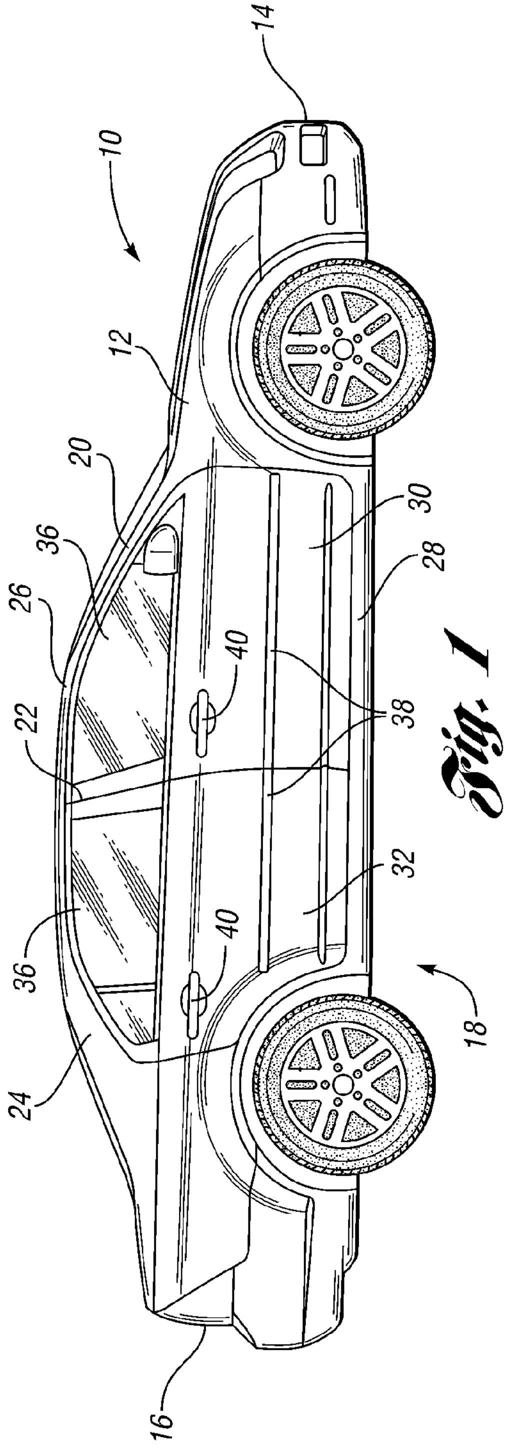
FIG. 1 is a side perspective view of a vehicle having a power side entry door in a closed position.

Referring now to FIG. 1, a vehicle is illustrated in accordance with an embodiment of the present invention and is referenced generally by numeral 10. The vehicle 10 has a vehicle body 12. Although a sedan is depicted and described, the invention contemplates utilization of any passenger vehicle.

The vehicle body 12 has a front end 14 and a rear end 16. The front end 14 is toward the forward direction of travel of the vehicle 10 and the rear end 16 is toward the rearward direction of travel of the vehicle 10. Any size or shape for the vehicle body 12, front end 14 and the rear end 16 is contemplated within the scope of the present invention.

The first lateral side 18 has an A-pillar 20, a B-pillar 22 and a C-pillar 24. Each of the A-pillar 20, a B-pillar 22 and a C-pillar 24 is supported on a top end by a roof member 26 and a bottom end by a floor member 28. Although an A-pillar 20, a B-pillar 22 and a C-pillar 24 are illustrated, any amount of pillars 20 is contemplated within the scope of the present invention.

The A-pillar 20, B-pillar 22, roof member 26 and floor member 28 define a first door opening which is enclosed with a front side entry door 30. As discussed below in further detail, the front side entry door 30 is a power door, which can be driven to an open position and a closed position. The front side entry door 30 is in the closed position in both FIGS. 1 and 2. The front side entry door 30 may be hingedly connected the A-pillar 20 and have an operating path so that the front side entry door 30 opens toward the front end 14 of the vehicle 10. In another embodiment, the front side entry door 30 is hingedly connected to the B-pillar 22 so that the front door 30 opens toward the rear end 16 of the vehicle 10. Any suitable hinged connection between the front side entry door 30 and one of the A-pillar 20 and B-pillar 22 is contemplated within the scope of the present invention.

Figure 2:
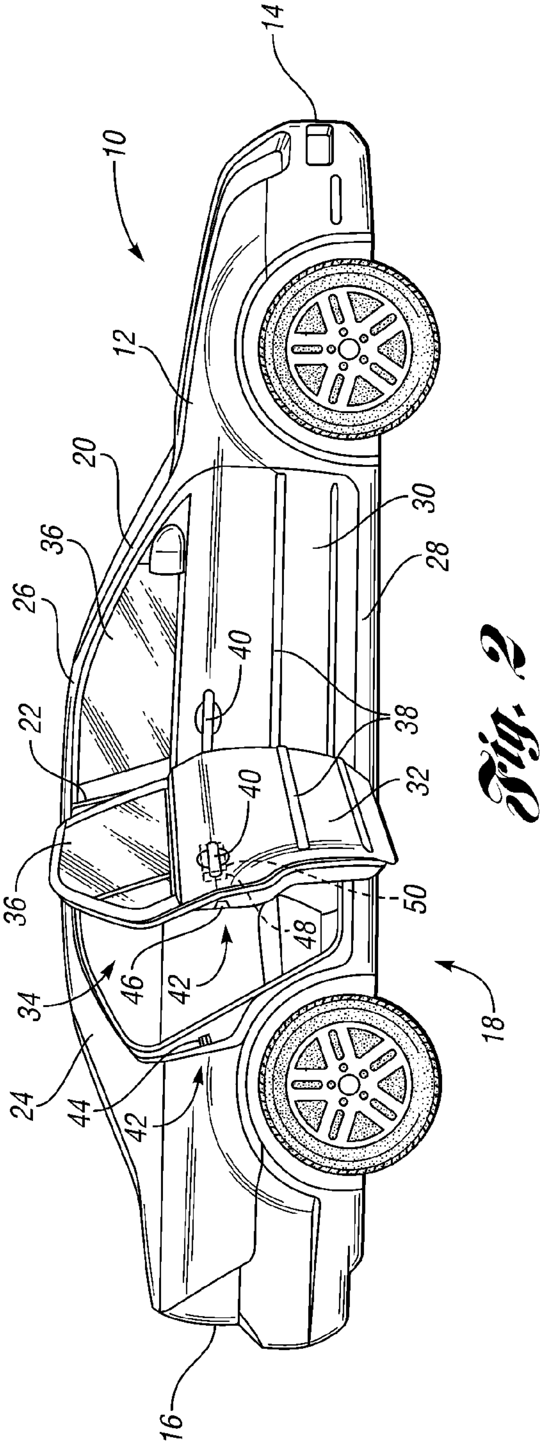
FIG. 2 is a side perspective view of the vehicle of FIG. 1 with the power side entry door in an open position.

The B-pillar 22, C-pillar 24, roof member 26 and floor member 28 define a second door opening 34 as depicted in FIG. 2 with a rear side entry door 32 hingedly attached to the B-pillar 22 in the open position. As discussed below in further detail, the rear side entry door 32 is a power door which may be driven to an open position and a closed position. The rear side entry door 32 moves from the closed position illustrated in FIG. 1 to the open position illustrated in FIG. 2 along a corresponding operating path toward the front end 14 of the vehicle 10. In another embodiment, the rear side entry door 32 is hingedly connected to the C-pillar 24 so that the rear side entry door 32 moves toward the rear end 16 of the vehicle 10. Any suitable hinged connection between the rear side entry door 32 and one of the B-pillar 22 and the C-pillar 24 is contemplated within the scope of the present invention.

Although a front side entry door 30 and a rear side entry door 32 are depicted in FIGS. 1-2, any suitable amount of side entry doors 30, 32 is contemplated within the scope of the present invention. In one non-limiting example, the first lateral side 18 has one side entry door 30 or 32 while an opposing lateral side has one or more side entry doors 30, 32. In another non-limiting example, the first lateral side 18 has more than two side entry doors 30 and 32 while an opposing lateral side has one or more side entry doors 30, 32.

The front side entry door 30 and the rear side entry door 32 each have a window 36 mounted therein. The window 36 may be powered to translate toward the floor member 28 to open the window 36 and subsequently is translatable toward the roof member 26 to close the window 36.

As depicted, the front side entry door 30 and the rear side entry door 32 each have a rub strip 38 provided on an exterior portion of the doors 30, 32. The rub strips 38 provide protection from approaching objects for the doors 30, 32 so that the exterior surface of the doors 30, 32 is not damaged. The rub strips 38 may be made of any suitable material.

In the illustrated embodiment, the side entry doors 30, 32 each have a handle 40 mounted thereto. The passenger can grasp the handle 40 to manually open one of the side entry doors 30, 32. In another embodiment, the handle 40 actuates the power doors 30, 32.

The rear side entry door 32 is illustrated in FIG. 2 with a latch assembly 42. The latch assembly 42 allows the passenger to open and close one side entry door 32. The latch assembly 42 may further include a striker 44 mounted on the vehicle body 12 and a latch 46 mounted in the door 32 as illustrated. The latch assembly 42 is connected with an inner handle (not shown) and the outer handle 40 so that when a passenger grasps one of the inner handle and the outer handle 40, the striker 44 is released from the latch 46 to allow the passenger to manually translate the door 32. Any suitable latch assembly 42, striker 44 and/or latch 46 is contemplated within the scope of the present invention. The striker 44 may be mounted in the door 32 while the latch 46 is mounted on the vehicle body 12. Although the latch assembly 42 is illustrated in the rear side entry door 32, either side entry door 30, 32 may utilize the latch assembly 42.

The rear side entry door 32 is illustrated in FIG. 2 with a locking mechanism 48. Each of the side entry doors 30, 32 has a locking mechanism 48. The locking mechanism 48 prevents the opening and closing of the rear side entry door 32 when in a locked position so that if the passenger pulls on an inside handle or the outside handle 40, the rear side entry door 32 does not open.

In one embodiment, the latch assembly 42 communicates directly with a lock controller 50 so that the locking mechanism 48 is not necessarily employed. The lock controller 50 utilizes computer software to signal a locked state and an unlocked state to the latch assembly 42. When the lock controller 50 is in the locked state, the rear side entry door 32 cannot be opened even if the passenger grasps one of the inner handle and the outer handle 40. When the lock controller 50 is in the unlocked state, the rear side entry door 32 can be opened if the passenger grasps one of the inner handle and the outer handle 40 so that the striker 44 is released from the latch 46, which allows the passenger to manually translate the door 32.

Figure 3:
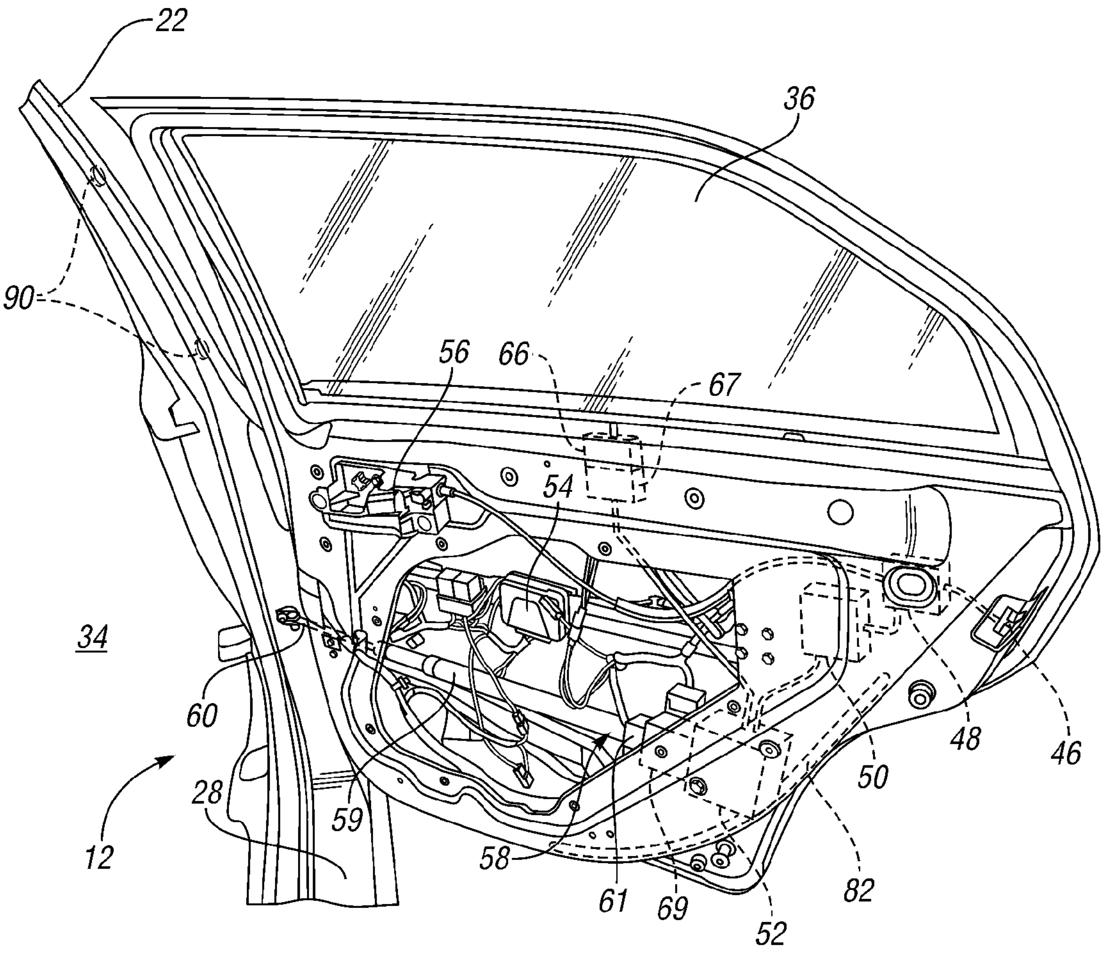
FIG. 3 is a perspective view of FIG. 1.

Referring now to FIG. 3, a rear power side entry door 32 is depicted with paneling removed for illustration purposes. Although a power side entry door 32 is illustrated, in another embodiment the rear power side entry door is a front power side entry door 32.

The rear power side entry door 32 has a motor 52, which drives the rear power side entry door 32 from the closed position, illustrated in FIG. 1 to the open position illustrated in FIGS. 2-3. The motor 52 also drives the rear power side entry door 32 from the open position, illustrated in FIGS. 2-3 to the closed position illustrated in FIG. 1. In one embodiment, an electric D.C. motor 52 is utilized. Of course, any suitable motor 52 is contemplated within the scope of the present invention.

In one embodiment, the motor 52 is connected to a controller 54, which sends a signal to activate the motor 52 to open the rear power side entry door 32. In one embodiment, the controller 54 receives an input signal provided to the controller 54 from a remote keyless entry receiver. The remote keyless entry receiver is in wireless communication with a remote keyless entry transmitter so that when a passenger presses a button on the remote keyless entry transmitter or otherwise actives the transmitter, the receiver receives the wireless communication and transmits the input signal to activate the motor 52. In another embodiment, the input signal sent from the controller 54 to the motor 52 deactivates the motor 52 to stop motion of the rear power side entry door 32.

In another embodiment, actuation of the controller 54 is achieved by an input signal provided to the controller 54 when a button is pressed or handle is pulled (not shown) on a portion of the latch system or on a door handle control system 56. Of course, any suitable controller 54 may be utilized within the scope of the present invention. The motor 52 is connected to a transmission 58 to drive the rear power side entry door 32 to open and close. In the depicted embodiment, the transmission 58 has a lead screw 59 and a gear box 61. The gear box 61 may be directly connected to the motor 52 to transmit the higher speed of the motor 52 into a lower output speed. The lower output speed of the gear box 61 is then transmitted to the lead screw 59 so that the lead screw 59 is translated.

By employing a lead screw 59, the transmission 58 has a prolonged life, which should require no maintenance during the life of the vehicle 10. Lubrication is required to operate the lead screw 59, which keeps the rear power side entry door 32 clean. The lead screw 59 has a long life, which allows for an overall long life for the rear power side entry door 32. Operation of the lead screw 59 and gear box 61 is quiet in comparison to other power doors. Precision of the motion of the lead screw 59 may be increased by using a lead screw with a smaller thread. Although a lead screw 59 provides many advantages, any suitable transmission 58 is contemplated within the scope of the present invention.

As depicted, the lead screw 59 is connected by the gear box 61 to the motor 52 near one end and to a link 60 near a second end. The link 60 is pivotally connected to the lead screw 59 and pivotally connected to the pillar 22 of the vehicle body 12.

Figure 5:
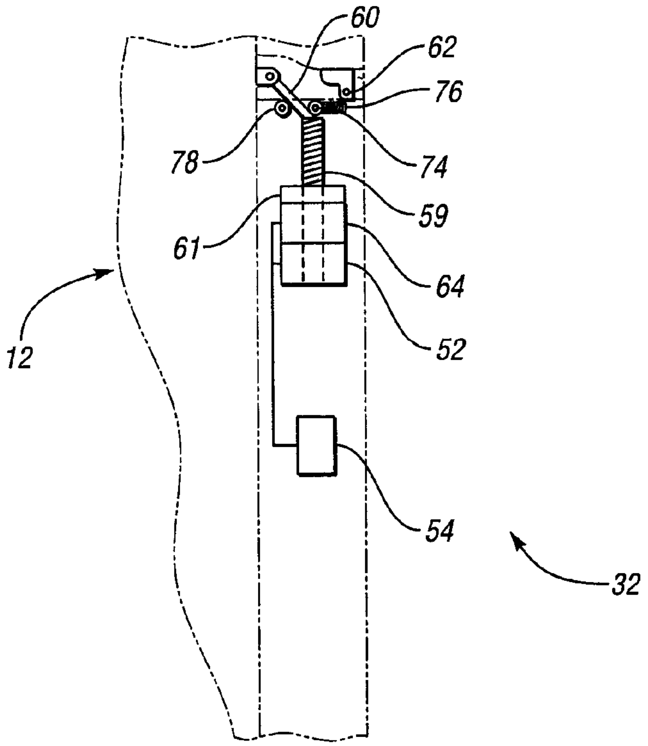
FIG. 5 is a top plan view of FIG. 1.

As illustrated in FIG. 5, the rear power side entry door 32 is in a closed position. To move to the open position, illustrated in FIG. 6, the motor 52 drives the lead screw 59 to translate a distance equal to a stroke, which may be predetermined and controlled by the controller 54. In one embodiment, the stroke is approximately four inches. The lead screw 59 is pivotally connected with the link 60 to push the link 60 away from the rear power side entry door 32 so that the rear power side entry door 32 pivots about the hinge 62 to open the rear power side entry door 32. To close the rear power side entry door 32, the lead screw 59 pulls link 60 toward the rear power side entry door 32 so that the rear power side entry door 32 pivots about the hinge 62 closing the rear power side entry door 32.

Figure 6:
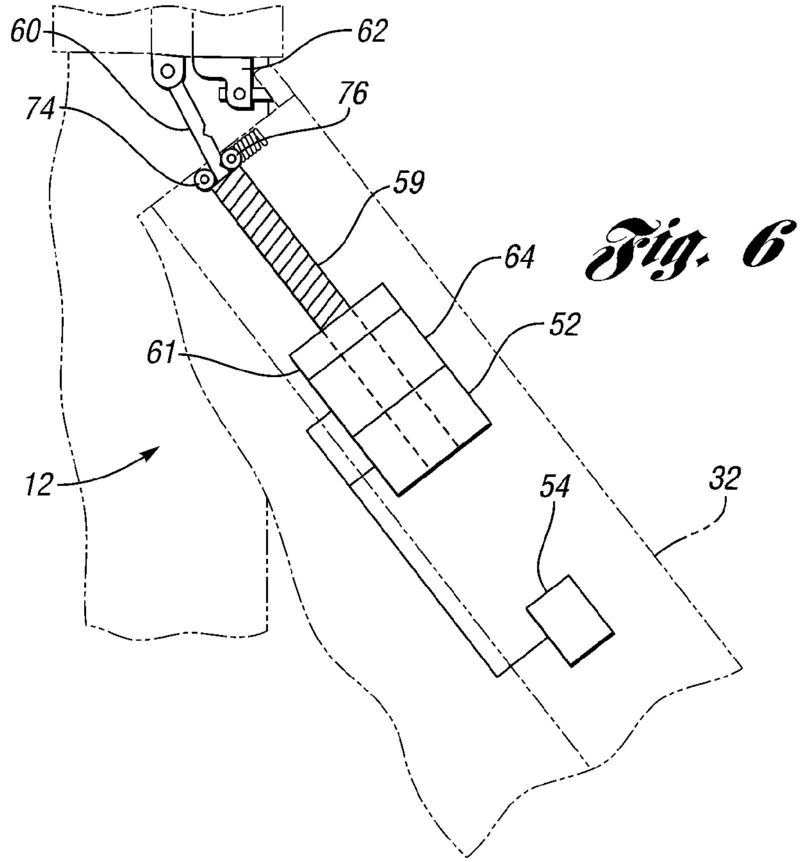
FIG. 6 is a top plan view of FIG. 2.

To allow manual translation of the rear power side entry door 32 between the closed position illustrated in FIG. 5 and the open position illustrated in FIG. 6, an electric clutch 64 is provided between the motor 52 and the lead screw 59. In one embodiment, the electric clutch 64 is connected to the controller 54. The controller 54 provides a signal to the electric clutch 64 to engage and disengage the motor 52 from the transmission 58. The electric clutch 64 disengages the motor 52 from the transmission 58 so that the passenger may manually open and close the rear power side entry door 32. When the electric clutch 64 engages the motor 52 and the lead screw 59, the motor 52 drives the lead screw 59 to translate the link so that the rear power side entry door 32 pivots about the hinge 62 to open or close the rear power side entry door 32. Any known electric clutch 64 may be employed.

Figure 4:
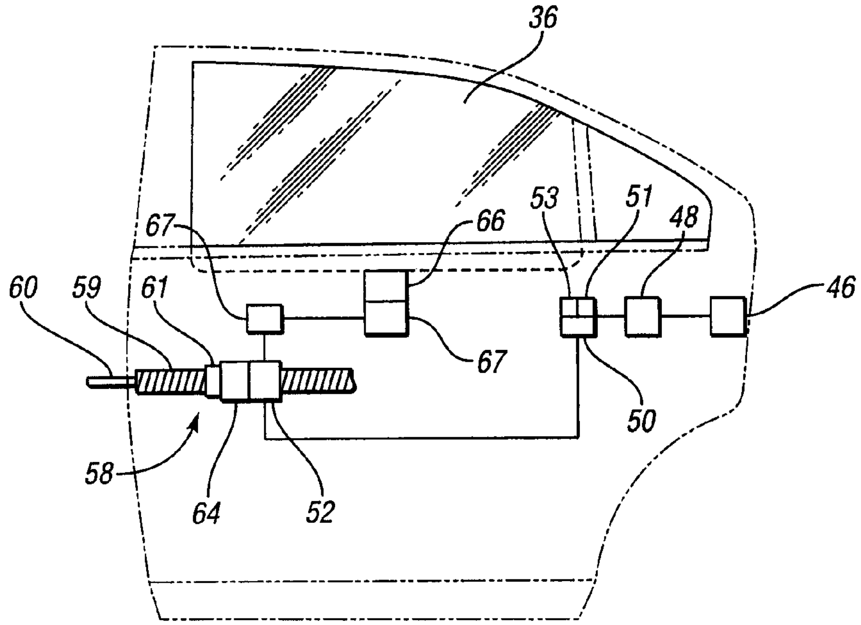
FIG. 4 is a schematic view of the FIG. 1.

Referring now to FIG. 4, the motor 52 is depicted in connection with the transmission 58, a lock controller 50 and a window transmission 66. One motor 52 may be provided to drive each of the transmission 58, the lock controller 50 and the window transmission 66 when the motor 52 is selectively engaged with one of the transmission 58, the lock controller 50 and the window transmission 66. A clutch 64 may be provided between the motor 52 and the transmission 58 to disengage the motor 52 while the motor drives the lock controller 50 or the window transmission 66.

As depicted, the lock controller 50 is connected to the striker 44 and the locking mechanism 48. In one embodiment, the motor 52 drives the lock controller 50 to lock and unlock the locking mechanism 48. In another embodiment, the lock controller 50 has a lock clutch 51 mounted therein. The lock clutch 51 engages the motor 52 with the locking mechanism 48 to drive the locking mechanism 48. The lock clutch 51 also disengages the motor 52 from the locking mechanism 48 to allow manual locking and unlocking of the locking mechanism and so that the motor 52 may be engaged with the transmission 58 to drive open the rear power side entry door 32. In another embodiment, the lock controller 50 has a solenoid 53 mounted therein. Of course, any suitable lock controller 50 is contemplated within the scope of the present invention.

In one embodiment, the motor 52 is connected with a window transmission 66. The window transmission 66 translates the window 36 between open and closed positions. A window clutch 67 may be provided between the motor 52 and the window transmission 66. The clutch 67 engages the motor 52 with the window transmission 66 to drive the window transmission 66 to open the window 36. The clutch 67 also disengages the motor 52 from the window transmission 66 so that the motor 52 may be engaged with the transmission 58 to drive open the rear power side entry door 32 or so that the motor may be engaged with the lock controller 50. Any suitable window transmission 66 is contemplated within the scope of the present invention.

Figure 7:
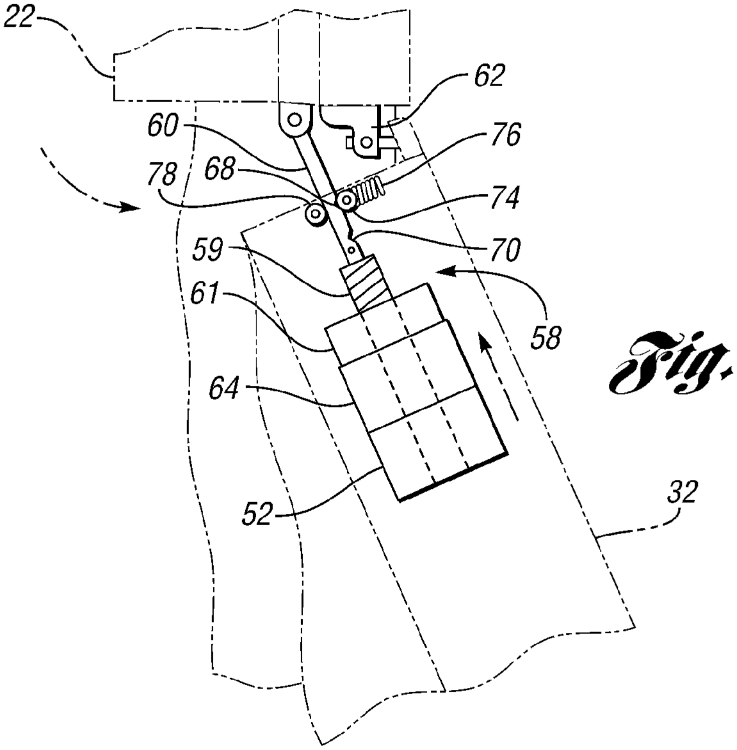
FIG. 7 is an enlarged view of another embodiment of a portion of the vehicle of FIG. 6.

With reference now to FIG. 7, an enlarged view of an embodiment of the rear power side entry door 32 in an open position is illustrated. The lead screw 58 is pivotally connected to the link 60. As illustrated, the link is a check strap 60 which has a pivotal connection with the pillar 22 of the vehicle body 12.

In the depicted embodiment, the check strap 60 has a first detent 68 and a second detent 70 formed therein to cooperate with a roller 74. The detents 68, 70 allow the rear power side entry door 32 to stop in an intermediate open position and the fully open position. Of course, any suitable amount of detents 68, 70 is contemplated within the scope of the present invention. Additionally, the detents 68, 70 may vary in size and/or shape to allow for varying smoothness of travel for the roller 74 and the rear power side entry door 32.

With the roller in the first detent 68, as illustrated, the rear power side entry door 32 is in the intermediate open position, which is between the closed position and the fully open position. In this position, the rear power side entry door 32 may be manually open or closed or may be driven open or closed. As the rear power side entry door 32 moves along the operation path as indicated by the arcuate arrow proximate check strap 60, the roller 74 generally travels along the check strap away from the pillar 22 since the lead screw 58 moves toward the pillar 22 as indicated by the arrow proximate the motor 52. When the roller 74 reaches the second detent 70, the rear power side entry door 32 is in the fully open position. If the roller 74 rests in the second detent 70, the rear power side entry door 32 is in the open position. If the roller 74 moves from the first detent 68 toward the pillar 22, the rear power side entry door 32 moves from the intermediate position to the closed position.

The roller 74 has a spring 76 mounted within the rear power side entry door 32 to further guide the roller 74 into the detents 68, 70 to ensure that the rear power side entry door 32 stops in the open position and intermediate position. A second roller 78 may be provided to improve translation of the first roller 74 along the check strap 60.

Figure 8:
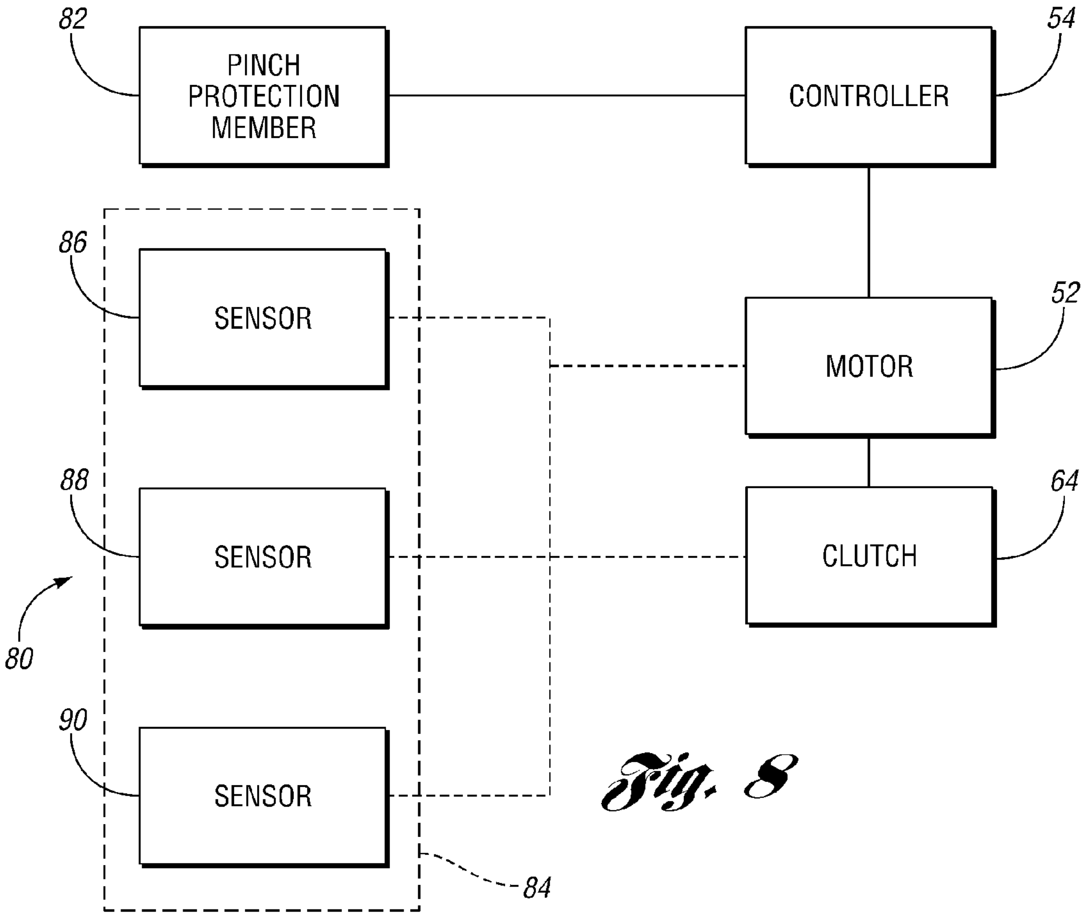
FIG. 8 is a block diagram of embodiments of an obstacle detection system for use in a vehicle with a power side entry door.

Referring now to FIG. 8, an obstacle detection system is depicted and generally referenced by the numeral 80. The obstacle detection system 80 allows for translation of the rear power side entry door 32 when an object is not detected in the operating path of the rear power side entry door 32. Any suitable obstacle detection system 80 may be utilized. An example of an obstacle detection system 80 that may be employed is discussed in U.S. Pat. No. 7,219,945 issued to Gregory B. Zinn et al. on May 22, 2007, which is assigned to Ford Global Technologies, LLC and is incorporated by reference herein.

In one embodiment, a pinch protector member 82 is provided in communication with the obstacle detection system 80. The pinch protector member 82 may be mounted on the rear power side entry door 32, as depicted in FIG. 3. The pinch protector member 82 is connected with the controller 54 to produce a signal to the controller 54 to stop the motor 52 if an object in detected by the pinch protector member 82 as is further discussed in the U.S. Pat. No. 7,219,945.

In another embodiment, the obstacle detection system 80 further includes a sensor system 84. The sensor system 84 may communicate directly with the motor 52 to stop translation of the motor 52. In another embodiment, the sensor system 84 communicates with the clutch 64 to disengage the motor 52 from the transmission 58 to stop translation of the rear power side entry door 32 so that the rear power side entry door 32 does not collide with an object in the operating path.

The sensor system 84 may have a first sensor 86, a second sensor 88 and a third sensor 90. Of course any suitable number of sensors 86, 88 and 90 are contemplated within the scope of the present invention. In one embodiment, the sensors 86, 88 and 90 of the sensor system 84 are ultrasonic sensors such that they send out an ultrasonic signal to determine if an object is within range of the sensors 86, 88 and 90. In another embodiment, the sensors 86, 88 and 90 of the sensor system 84 are radar sensors by using electromagnetic waves to identify if an object is within the range of the sensors 86, 88 and 90.

Figure 9:
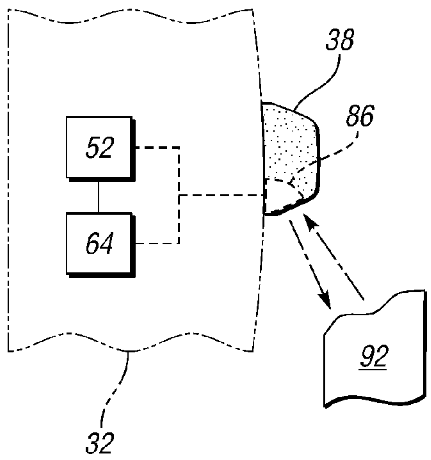
FIG. 9 is a cross-sectional view of an embodiment of a rub strip of FIG. 1.

The first sensor 86 may be mounted within a rub strip 38 as illustrated in FIG. 9 to stop translation of the side entry door 32 when the side entry door 32 moves from a closed position to an open position. The first sensor 86 is not visible to an occupant because the rub strip 38 is provided on the side entry door (as seen in FIGS. 1 and 2) below a line of sight of a passenger and the placement of the sensor 86 on a bottom side of the rub strip 38. If an object 92 is detected by the sensor 86 through the signal of the sensor 86, then the sensor 86 provides an output signal to the motor 52 to stop translation of the motor 52 and stop the side entry door 32 from further opening. In another embodiment, the output signal of the sensor 86 is sent to the clutch 64 to disengage the motor 52 and stop translation of the side entry door 32.

Figure 10:
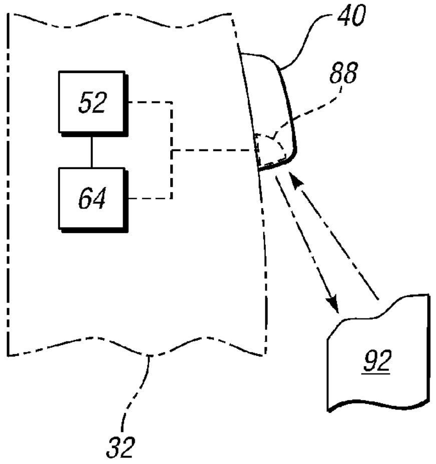
FIG. 10 is a cross-sectional view of an embodiment of a door handle of FIG. 1.

As depicted in FIG. 10, the second sensor 88 may be mounted within a handle 40 to stop translation of the side entry door 32 when the side entry door 32 moves from a closed position to an open position. The second sensor 88 is not visible to an occupant because the handle 40 is provided on the side entry door (as seen in FIGS. 1 and 2) below the line of sight of the passenger and the placement of the sensor 88 on a bottom side of the handle 40. If an object 92 is detected by the sensor 88 through the signal of the sensor 88, then the sensor 88 provides an output signal to the motor 52 to stop translation of the motor 52, thus preventing the side entry door 32 from opening any further. In another embodiment, the output signal of the sensor 88 is sent to the clutch 64 to disengage the motor 52 to stop the side entry door 32 from opening further.

With reference again to FIG. 3, the third sensor 90 is depicted in alternative locations on the pillar 22 to stop translation of the side entry door 32 when the side entry door 32 moves from an open position to a closed position. In another embodiment, the third sensor 90 is mounted at both of the locations on the pillar 22 depicted. If an object is detected by the third sensor 90, then the sensor 90 provides an output signal to the motor 52 to stop translation of the motor 52, as seen in FIG. 8. In another embodiment, the output signal of the sensor 90 is sent to the clutch 64 to disengage the motor 52 and stop the side entry door from closing further.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A passenger vehicle comprising:

a vehicle body having a first pillar, a second pillar, a roof member and a floor member defining a door opening therebetween;

a lateral side entry door pivotally connected to the vehicle body for enclosing the door opening, the side entry door moving along an operating path and having a closed position and an open position;

a motor oriented in the side entry door;

a lead screw mounted in the side entry door and connected to the motor to be driven by the motor; and a link connected to the lead screw and connected to the vehicle body adjacent to the door opening;

wherein the motor drives the lead screw to translate the link to open and close the side entry door.

2. The passenger vehicle of claim 1 further comprising an electric clutch provided between the motor and the lead screw to allow manual translation of the side entry door along the operating path when disengaged and to couple the motor and the lead screw so that the motor drives the lead screw when engaged.

3. The passenger vehicle of claim 1 further comprising:

a lock mechanism provided within the side entry door for cooperating with the vehicle body to lock the side entry door in a closed position; and a clutch provided between the motor and the lock mechanism to disengage the motor from the lock mechanism to allow manual locking and unlocking of the lock mechanism and to engage the motor and the lock mechanism so that the motor drives the lock mechanism to lock or unlock.

4. The passenger vehicle of claim 1 further comprising a translatable window mounted within the side entry door, wherein operation of the motor drives the translatable window to open and close the window.

5. The passenger vehicle of claim 1 further comprising a latch assembly provided within the vehicle body and the side entry door to secure the side entry door to the vehicle body in the closed position.

6. The passenger vehicle of claim 5 wherein the latch assembly is controlled by computer software to lock the side entry door in the closed position.

7. The passenger vehicle of claim 1 wherein the link is further defined as a check strap to maintain the side entry door in an intermediate position between the open position and the closed position.

8. The passenger vehicle of claim 7 wherein the check strap further comprises at least one detent provided therein to cooperate with a pair of rollers for manual translation of the side entry door.

9. The passenger vehicle of claim 1 further comprising an obstacle detection system in communication with the motor for determining when an object is in the path of the side entry door to stop translation of the motor.

10. The passenger vehicle of claim 9 further comprising a pinch protection member provided between the side entry door and the door opening in communication with the obstacle detection system.

11. The passenger vehicle of claim 9 wherein the obstacle detection system further comprises a sensor provided proximate the side entry door to provide an output signal to one of the motor and an electric clutch connected to the motor to stop translation of the side entry door when an object is detected in the operating path of the side entry door.

12. The passenger vehicle of claim 11 wherein the sensor provides the output signal to the motor.

13. The passenger vehicle of claim 11 wherein the sensor provides the output signal to the electric clutch.

14. The passenger vehicle of claim 11 wherein the sensor further comprises at least one ultrasonic sensor.

15. The automotive vehicle of claim 11 wherein the sensor further comprises at least one radar sensor.

16. The passenger vehicle of claim 11 further comprising a rub strip provided on an outer portion of the side entry door, wherein the sensor is mounted in the rub strip of the side entry door to provide an output signal to stop translation of the side entry door when an object is detected in the operating path of the side entry door as the side entry door travels from the closed position to the open position.

17. The passenger vehicle of claim 11 further comprising a handle provided on an outer portion of the side entry door to allow manual translation of the side entry door, wherein the sensor is provided in the handle of the side entry door to provide an output signal to stop translation of the side entry door when an object is detected in the operating path of the side entry door as the side entry door travels from the closed position to the open position.

18. The passenger vehicle of claim 11 wherein the sensor is provided in one of the first and second pillars of the vehicle body such that the sensor provides an output signal to stop translation of the side entry door when an object is detected in the operating path of the side entry door as the side entry door travels from the open position to the closed position.

19. An automotive vehicle comprising:

a vehicle body having a first pillar, a second pillar, a roof member and a floor member defining a door opening therebetween;

a side entry door pivotally connected to the vehicle body for enclosing the door opening, the side entry door moving along an operating path and having a closed position and an open position;

a motor oriented in the side entry door;

a transmission mounted on the side entry door and connected to the motor to be driven by the motor; and a check strap mounted on the vehicle body and pivotally connected to the transmission, the check strap having at least one detent provided therein to cooperate with at least one roller for manual translation of the side entry door, the check strap maintaining the side entry door in an intermediate position between the open position and the closed position;

wherein the motor drives the transmission to translate the check strap to open and close the side entry door.

20. A power door assembly for a vehicle, comprising:

a side entry door having a first hinge portion to be pivotally connected to a vehicle body for movement along an operating path for opening the side entry door from the door opening and closing the side entry door to the door opening;

a motor oriented in the side entry door;

a lead screw mounted in the side entry door and connected to the motor to be driven by the motor; and a link connected to the lead screw and adapted to be connected to the vehicle body adjacent to the door opening;

wherein the motor drives the lead screw to translate the link to open and close the side entry door.

* * * * *